United States Patent [19]

Bolfik et al.

[11] Patent Number: 4,858,676
[45] Date of Patent: Aug. 22, 1989

[54] AIRCONDITIONING SYSTEM FOR A VEHICLE

[75] Inventors: Lawrence J. Bolfik; Calvin G. Smith, both of Dearborn, Mich.

[73] Assignee: Ford Motor Company, Dearborn, Mich.

[21] Appl. No.: 253,518

[22] Filed: Oct. 5, 1988

[51] Int. Cl.[4] .............................................. F25B 29/00
[52] U.S. Cl. ........................................ 165/2; 165/12; 165/16; 165/42; 165/43; 62/133; 98/2.01; 98/2.11
[58] Field of Search ................ 165/2, 16, 12, 42, 43; 62/133; 236/49; 98/2.01, 2.06, 2.07, 2.11

[56] References Cited

U.S. PATENT DOCUMENTS

| | | |
|---|---|---|
| 3,403,855 | 10/1968 | Bouthors et al. |
| 3,845,700 | 11/1974 | Lefeuvre ............................. 98/2.01 |
| 3,861,282 | 1/1975 | Scherenberg et al. |
| 4,044,287 | 8/1977 | Ratzel et al. ........................ 62/133 |
| 4,364,513 | 12/1982 | Tsuzuki et al. ...................... 165/43 |
| 4,382,463 | 5/1983 | Ikebukuro ........................... 165/43 |
| 4,482,009 | 11/1984 | Nishimura et al. ................... 165/16 |
| 4,487,254 | 12/1984 | Hayashibara ........................ 165/16 |
| 4,508,021 | 4/1985 | Steinmann .......................... 98/2.01 |
| 4,518,032 | 5/1985 | Funasaki et al. ..................... 165/16 |
| 4,523,715 | 6/1985 | Ohsawa et al. ...................... 165/43 |
| 4,685,508 | 11/1987 | Iida ................................. 165/43 |
| 4,759,269 | 7/1988 | Brown et al. ........................ 98/2.01 |

FOREIGN PATENT DOCUMENTS

| | | | |
|---|---|---|---|
| 3006554 | 8/1981 | Fed. Rep. of Germany ....... | 98/2.01 |
| 2472489 | 7/1981 | France ............................... | 98/2.01 |
| 0053339 | 4/1977 | Japan ................................. | 62/133 |
| 0047312 | 4/1981 | Japan ................................. | 62/133 |
| 0082624 | 7/1981 | Japan ................................. | 62/133 |
| 0004418 | 1/1982 | Japan ................................. | 98/2.01 |
| 0078815 | 5/1985 | Japan ................................. | 98/2.01 |
| 2093233 | 8/1982 | United Kingdom ................. | 98/2.01 |

Primary Examiner—John Ford
Attorney, Agent, or Firm—Jerome R. Drouillard; Roger L. May

[57] ABSTRACT

An airconditioning system for a vehicle includes an air supply blower, an air chilling device, an air heating device, speed and power sensing systems for determining the speed and power levels at which the blower is operating, a speed governor for controlling the speed at which the blower is operating, a temperature governor, operatively associated with the air chilling and air heating devices, for controlling the temperature of conditioned air supplied by the blower to the interior of the vehicle, and a controller responsive to blower speed and power consumption for operating the temperature governing device.

17 Claims, 3 Drawing Sheets

AIRCONDITIONING SYSTEM FOR A VEHICLE

BACKGROUND OF THE INVENTION

1. Field of the Invention

This invention relates to an airconditioning system for a vehicle which offers rapid and precise temperature control notwithstanding varying ram air conditions.

2. Disclosure Information

The design of vehicular airconditioning systems and controls has presented a variety of problems to the engineer. Not surprisingly, a variety of solutions to specific problems has resulted. One of the problems which has been addressed is the control of the mass flow through a vehicle in terms of not only the total flow through the vehicle but also the direction of the airconditioned mass flow through the vehicle. U.S. Pat. No. 3,403,855 discloses a system for damping an outside air intake port as a function of vehicle speed. U.S. Pat. No. 3,861,282 discloses a system for controlling blower speed as a function of vehicle speed. Japanese Patent No. 60-78815 discloses a system in which electrical power fed to an airconditioning system blower is reduced when the occupants of the vehicle open a window. None of the systems disclosed in the previously listed patents is capable of controlling the temperature of air processed by the airconditioning system in response to changes in blower speed and power consumption caused by ram air effects.

U.S. Pat. No. 4,759,269, which is assigned to the assignee of the present invention, discloses a system for maintaining independent air flows to two or more separate segments of the interior of a motor vehicle The '269 Patent does not, however, deal with the problem of maintaining constant system temperature or mass flow during changing environmental conditions.

U.K. Patent Application No. 2,093,233 discloses a system and method for regulating the quantity of air supply to the interior of a vehicle in which variations in the current being supplied to the blower motor are used to damp the air inlet to the vehicle at a location upstream of the blower. The system of the U.K. patent application suffers from a serious fault insofar as the system is incapable of compensating for an operating condition wherein the pressure at the air inlet is less than that of still air. Such a condition could be encountered, for example, when a tailwind having a velocity in excess of the linear velocity of the vehicle impinges upon the vehicle. The system of the U.K. application suffers from additional drawbacks. For example, the outside damper assembly causes added system complexity, cost, package space and reliability concerns. Japanese Patent No. 57-4418A discloses a system in which an outer air damper is controlled as a function of detection of a gas within the interior of the vehicle. This system, too, is incapable of correcting for ram air impinging upon the vehicle.

U.S. Pat. Nos. 4,382,463 and 4,482,009 deal with distribution of mass flow within the passenger compartment of the vehicle. Each discloses a system for redistributing mass flow within the passenger compartment based upon the occupancy of the passenger compartment.

U.S. Pat. No. 4,364,513 discloses a system for controlling discharged air based upon the sensing of occupants within the vehicle.

U.S. Pat. No. 4,518,032 discloses a system for controlling the various components of a vehicular airconditioning unit so that the blower speed will be limited while operating in the heating mode so as to prevent excessive heating of the interior compartment of the vehicle.

It is an object of the present invention to provide an airconditioning system having the capability of responding rapidly to changes in the ram air impinging upon an air inlet of the airconditioning system.

It is an advantage of the present airconditioning system that changes in ram air impingement upon the air inlet of the system will be met by adjustment of the blower speed and heat flux of the airconditioning system without the necessity of waiting for the temperature of the interior of the vehicle to change.

It is yet another advantage of the present airconditioning system that comfort of the vehicle's passengers will be maintained without the need for additional flow control doors.

It is a feature of one aspect of the present invention that a control system according to this invention will not need a separate device for measuring the speed of the airconditioning system's blower but will employ a signal generated by the blower motor itself for this purpose.

Other objects, features and advantages of the present invention will become apparent to the reader of this specification.

SUMMARY OF THE DISCLOSURE

In accordance with this invention, an airconditioning system for a vehicle comprises an air supply blower, an air chilling device, which may, for example, comprise an evaporator core, an air heating device which may, for example, comprise a heater core, and speed sensing means for determining the speed at which the blower is operating and for generating a speed signal corresponding to the blower speed. A system according to the present invention further includes power sensing means for determining the power being consumed by the blower and for generating a signal corresponding to power consumption, temperature governing means operatively associated with the air chilling device and the air heating device for controlling the temperature of conditioned air supplied by the blower to the interior of the vehicle, and control means, responsive to the speed and power signals, for operating the temperature governing means. A system according to the present invention may further include speed governing means for controlling the speed at which the blower is operating. The control means may comprise means for detecting nonprogrammed changes in the blower speed and power and means for compensating for such nonprogrammed speed and power changes by changing the operating point of the temperature governing means. The control means may further comprise means for operating the speed governing means and means for compensating for nonprogrammed speed and power changes by changing the operating point of the speed governing means.

The temperature governing means used in a system according to the present invention may comprise a blend door having the capability of directing any fraction of the output of the blower over the heater core. The blend door thus controls the heat flux provided by the temperature governing means so as to compensate for nonprogrammed blower speed and power changes. Alternatively, the temperature governing means may further comprise means for controlling the flow of engine coolant through the heater core and means for controlling the rate of flow of refrigerant through the evaporator core. A system according to the present invention may include blower speed sensing means comprising means for sensing electromotive force pulses generated by the blower motor and means for converting the pulses into a signal corresponding to the speed of the blower motor. The pulse conversion means may comprise means for transforming the pulses into a square wave having a frequency which is equivalent to the frequency of the pulses and means for counting the frequency of the resultant square wave.

According to the present invention, a method for controlling the output of a vehicular airconditioning system having a blower, an air heating device, an air chilling device and a temperature governing means operatively associated with said air chilling and air heating devices comprises the steps of: (i) sensing nonprogrammed changes in the speed and power consumption of the blower; (ii) determining adjusted operating points for the speed of the blower and the temperature governing means so as to compensate for nonprogrammed speed and power changes; and (iii) directing said blower and said temperature governing means to assume said adjusted operating points.

A system according to the present invention thus includes means for detecting nonprogrammed changes in blower speed and power consumption caused by changes in the the mass flow rate of air passing through the airconditioning system and means for compensating for such nonprogrammed speed and power changes by determining new operating points for the temperature governing means and blower speed governing means.

DESCRIPTION OF THE PREFERRED EMBODIMENTS

Figure 1:
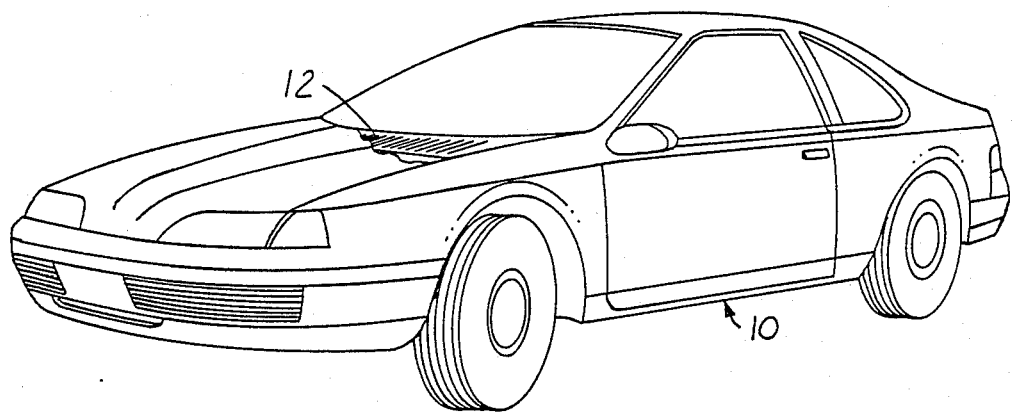
FIG. 1 is a schematic representation of a vehicle including a system according to the present invention.

As shown in FIG. 1, an airconditioning control system according to the present invention is conveniently employed with a vehicle having an outside air inlet, 12, for conducting ambient air into the airconditioning system. Air passing through the system is conditioned according to the arrangement shown in FIG. 2 and distributed to the interior of the vehicle.

Figure 2:
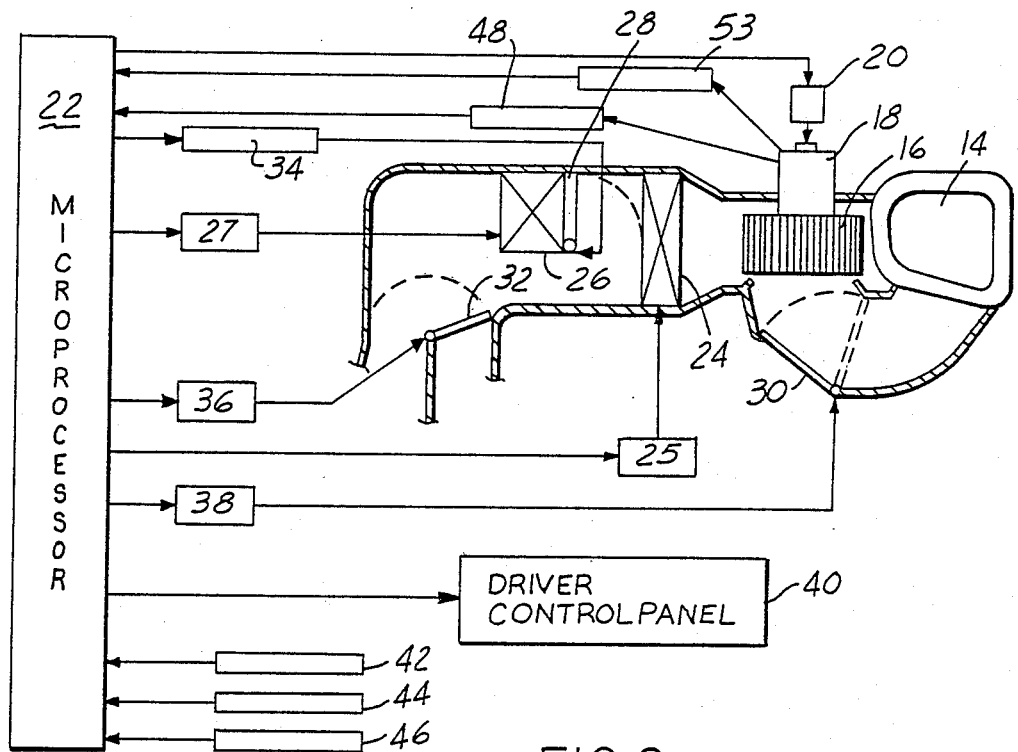
FIG. 2 is a schematic representation of an airconditioning system according to the present invention.

Turning now to FIG. 2, air is drawn into inlet duct 14 and pushed through the balance of the airconditioning system by means of blower wheel 16, which is driven by blower motor 18. The speed of blower motor 18 is controlled by means of blower speed governor 20 in response to commands from control microprocessor 22. Those skilled in the art will appreciate in view of this disclosure that microprocessor 22 and its peripheral equipment could be structured according to several different architectures. In a preferred embodiment, however, microprocessor 22 is configured so that control programs are sequentially read for each unit command from a read-only memory (ROM) which stores preset control programs. Unit commands are executed by a central processing unit (CPU). The microprocessor integrally includes input-output control circuits (I/O) for exchanging data with external devices and a random access memory (RAM) for temporarily holding data while the data are being processed. The microprocessor shown in FIG. 2 receives inputs from blower speed signal generator 53 and motor power sensor 48, as well as from engine coolant temperature sensor 42, ambient temperature sensor 44, and interior temperature sensor 46. Finally, microprocessor 22 receives input from the operator of the vehicle via driver control panel 40. Those skilled in the art will appreciate in view of this disclosure that a system according to this invention could further include sun load and ambient humidity sensors.

An airconditioning system according to the present embodiment further includes evaporator core 24, through which air being processed by the present system first passes and is chilled. In conventional fashion, the evaporator core may be connected with a compressor, a condenser, an expansion valve, and other control devices. Alternatively, the evaporator may comprise either a conventional heat pipe device or a conventional Peltier effect device or a conventional magnetic flux cooling device, or other type of device suggested by this disclosure. After passing through evaporator core 24, air undergoing the conditioning process passes to the vicinity of heater core 26. Those skilled in the art will appreciate that heater core 26 could comprise either a conventional heat exchanger warmed by circulating engine coolant, or a conventional electric resistance heater, or a conventional fuel-burning heater, or any other type of heater suggested by this disclosure.

In the event that it is desired to greatly increase the temperature of the air above the discharge temperature from core 24, blend door 28 will be swung completely open so as to allow all of the air passing through the system to pass through heater core 26. If, however, it is not desirable to heat the air passing through the system, at all, blend door 28 will be positioned by microprocessor 22, via actuator 34, in the fully closed position shown in FIG. 2. Those skilled in the art will appreciate in view of this disclosure that a variety of intermediate positions are available for blend door 28 lying between the fully opened and fully closed positions and that such intermediate positions may be employed for governing the temperature of air being discharged from a system according to the present invention.

Microprocessor 22 also operates recirculation door 30 and mode door 32. Recirculation door 30, which is operated by microprocessor 22 by means of actuator 38, allows the airconditioning system to utilize either outside air or inside air. The solid lines in FIG. 2 representing door 30 depict the door in the outside air mode. A system according to the present invention is intended principally for use when the airconditioning system is operating with air drawn from outside the vehicle, as opposed to recirculated air. Microprocessor 22 operates mode door 32 by means of actuator 36, which serves to shift the flow through the airconditioning system to various registers within the vehicle, such as the defrost or floor or panel registers.

Those skilled in the art will appreciate in view of this disclosure that any of the known means for operating various flow control doors may be employed in the various embodiments of this invention. For example, vacuum motor and stepper motor driven linkage mechanisms, or other motor designs or flow control door designs could be employed with this invention. Similarly, those skilled in the art will appreciate in view of this disclosure that other types of blowers other than the familiar squirrel cage shown in FIG. 2 with different aerodynamic elements such as axial flow devices, could be employed.

Figure 3:
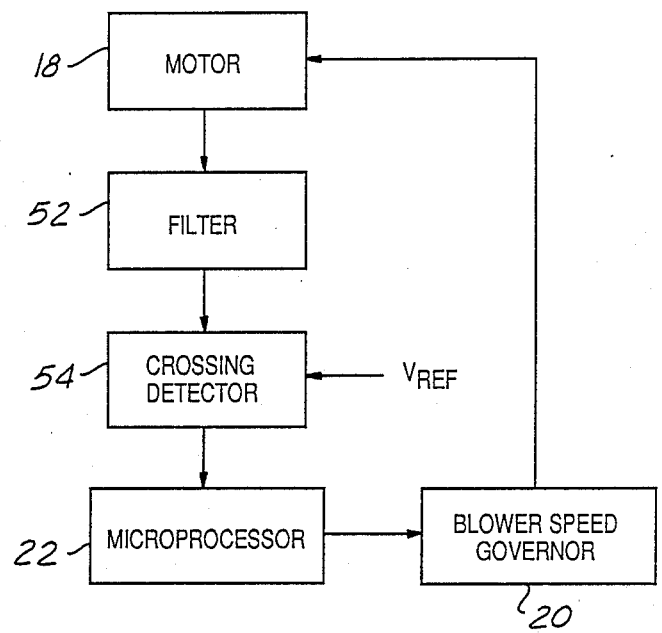
FIG. 3 is a block diagram illustrating the motor speed control portion of a system according to the present invention.

As noted above, a system according to the present invention relies upon the ability to sense the speed at which the blower is operating. FIG. 3 is a block diagram of one such system for sensing blower speed. It is known that many types of electric motors produce extraneous electromotive force impulses when operating. These extraneous electromotive force impulses are sometimes termed "back EMF". If the back EMF is filtered by well known means including band pass filtering, with the filtered signal being passed through a crossing detector, the back EMF may be converted into a square wave suitable for reading into a frequency counter. Accordingly, in FIG. 3, blower motor 18 is shown as being operatively connected with filter 52 which removes any objectionable AC or DC noise from the sensed back EMF. The output of filter 52 is then passed to crossing detector 54 which yields a square wave which is ultimately supplied to microprocessor 22, where the speed of the motor is determined by counting the number of square wave pulses over a predetermined time period. Those skilled in the art will appreciate that other types of blower speed sensing devices could be employed, such as electro-optical and Hall Effect sensors, to name only two. Those skilled in the art will further appreciate that in the event that an electronically commutated motor is employed in a system according to the present invention, the speed of the motor will be readily calculable from signals produced by the commutation controller. Microprocessor 22 outputs a speed signal to blower speed governor 20 which may comprise any one of numerous suitable and commonly employed devices for controlling the speed of a motor, such as a silicon controlled rectifier, a resistor bank, or other devices.

As noted above, the purpose of a system according to the present invention is to control the environment of a vehicular passenger compartment in a quick and Precise manner. Those skilled in the art will appreciate that electronic automatic temperature systems (EATC) used conventionally suffer from a drawback insofar as the flow of ram air through an outside air inlet such as 12 of FIG. 1 and then into inlet duct 14 of FIG. 2 and then through the balance of the airconditioning system will at least temporarily upset the temperature control of the system. This occurs because the greater mass flow caused by the ram air at a constant heat flux provided by evaporator core 24, heater core 26, and blend door 28 will result in a change in the temperature of the air discharged by the airconditioning system. Conventional systems respond to this type of operating regime by sensing an increase or decrease in the cabin temperature. Waiting for such a perturbation in cabin temperature to occur prior to taking remedial action is not, however, desirable, because the thermal inertia of the vehicle will cause a considerable delay in the restoration of the cabin temperature to the desired setpoint. If, however, one attempts to control the temperature of the discharged air by merely damping the flow at outside air inlet 12, the results will be unsatisfactory because it is possible under certain operating conditions e.g. with a tailwind impinging on the car, for the flow rate through the airconditioning system to be so low as to negate the effectiveness of a damper in controlling the temperature of the air discharged from the airconditioning system into the interior of the vehicle. To overcome these problems, a system according to the present invention operates as a subroutine of the main EATC control program according to the flow chart shown in FIG. 4.

Figure 4:
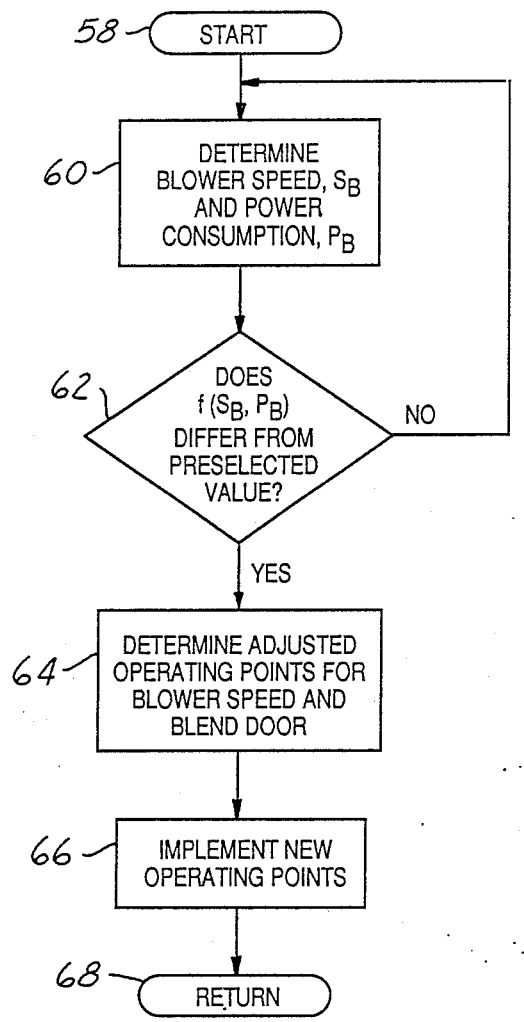
FIG. 4 contains a logic flow block diagram in accordance with an embodiment of this invention.

As shown in FIG. 4, a ram air compensation control program within microprocessor 22 begins at start block 58. Blower speed, $S_B$, and blower power consumption, $P_B$, are sensed at block 60. At block 62, a value for the function $f(S_B, P_B)$ is calculated and compared with a preselected value for the function. Those skilled in the art will appreciate in view of this disclosure that several different functions of blower speed and power, as well as other system variables, could be employed for keeping track of the mass flow passed by the blower. One example of such a function could involve taking the quotient comprising blower power consumption divided by blower speed. In any event, the operation at block 62 comprises the detection of nonprogrammed changes in blower speed and power consumption.

Blower power consumption may be determined at any particular time as the product of measured blower motor voltage and current. In general, blower motor power sensor 48 will operate by sensing both the current drawn by motor 18 and the voltage. Knowing these values, the power consumption may be calculated as the product of the current and voltage. Blower current and voltage may be measured according to any of several known methods known in the art and suggested by this disclosure.

The results of the comparison at block 62 are used in the following manner. In the event that the calculated function value does not depart from the preselected value by more than an appropriate deadband or hysteresis amount, the microprocessor will know that ram air is not causing a situation calling for an adjustment and the program therefore returns to block 60 to once again sense blower speed and power consumption. If, however, the calculated function does differ from the preselected value, the program continues to block 64, wherein adjusted operating points are determined for blower speed and blend door position. The ability to control blend door Position in response to ram air changes is important because the blend door controls the heat flux imparted to the air passing through the airconditioning system. Alternatively, the flow of engine coolant through heater core 26, and hence, the flow of heat through the core, could be altered by heater core flow controller 27, and the flow of refrigerant through evaporator core 24 could be altered by means of evaporator flow controller 25.

It is desirable to have the capability of controlling not only blower speed and power but also heat flux in response to ram air induced mass flow changes. This conclusion stems from the following considerations. First, with EATC, once a desired temperature operating point has been achieved, blower speed and power will usually be set at a low level. If however, the mass flow through the system increases due to the ram air effect, blower speed will decrease and blower power will increase due to the increased work required to accommodate the increased mass flow. Accordingly, the calculated value of the function $f(S_B, P_B)$ will change. Nevertheless, because in this example the blower is already operating at a low speed, the blower will be unable to greatly affect the mass flow through the vehicle, simply because even shutting the blower off will affect the mass flow little for a system designed to have low air-side flow losses. As a result, it will be necessary to maintain the temperature set point by swinging blend door 28 so as to either heat or cool the conditioned air by a greater or lesser extent, thereby changing the heat flux provided by the airconditioning system. Microprocessor 22 will determine the new location for blend door 28 by picking a new location value from a lookup table within the ROM, while using as input variables absolute blower speed, blower speed change, blower power consumption, ambient temperature, cabin temperature, desired temperature, and system operating state (e.g., heating or cooling). As an example, if the blower is operating at three volts out of a total of twelve volts, blower speed will be very low. Accordingly, the microprocessor will know that the position of the blend door must be changed in response to ram air effects. If the airconditioning system is operating in the cooling mode and if the ambient (outside) temperature is 100F, the microprocessor will further know that an increase in ram air should be met by a swing of blend door 28 in the direction such than more of heater core 26 is covered up, such that air passing through evaporator core 24 is not reheated. Those skilled in the art will appreciate in view of this disclosure that the lookup table described above could be supplanted by an mathematical formula or algorithm for calculating blend door position and blower program speed.

As an alternative to working exclusively with blend door 28 in the example recited above, the same variables and lookup table approach may be employed to alter the operating points of evaporator flow controller 25 and heater core flow controller 27 immediately to either increase or decrease their flow rates, so as to affect the heat flux bearing upon air passing through the airconditioning system. As a further alternative, the blend door could be eliminated, with the heat flux being controlled solely by means of evaporator flow controller 25 and heater core flow controller 27. If for example, it is desired to heat the incoming air to a greater extent, the rate of flow of refrigerant through evaporator core 24 could be reduced while increasing the rate of flow of engine coolant through heater core 26. Conversely, if it is desired to chill the air to a greater extent, the evaporator flow may be increased, while decreasing the heater core flow.

In contrast to the situation obtained when the blower is being operated at a low speed, in the event that the vehicle has not reached the specified final interior temperature, as sensed by interior temperature 46, the blower will generally be operating at a high speed. In this case, an increased mass flow through the airconditioning system due to ram air may be compensated for, either wholly, or partially, by a change in blower speed. Accordingly, if blower speed is high and air flow increases, the blower speed will initially decrease and power will increase due to the increased mass flow through the system. The calculated value of the function $f(S_b, P_B)$ will change as well. Microprocessor 22 will select a new blower program speed representing a decrease to a new operating point such that the calculated value of $f(S_B, P_B)$ is maintained at the preselected value. Because of the nature of the calculations being performed, those skilled in the art will appreciate that it may be necessary to perform the adjustment of blower speed as an iterative process in which the new blower speed is selected by microprocessor 22, the speed is communicated to blower speed governor 20, and the effect of the change noted at block 62 of FIG. 4, with further adjustment as required to bring $f(S_B, P_B)$ within an acceptable tolerance. In this manner, the mass flow through the airconditioning system and the temperature of air discharged by the system will be maintained at a relatively constant level without the necessity of changing either the blend door position or the operating points of evaporator flow controller 25 or heater core flow controller 27.

Those skilled in the art will appreciate in view of this disclosure that a system according to the present invention will be useful for maintaining the interior temperature of a vehicle in a situation wherein the vehicle turns from a crosswind into a tailwind. In this type of operating regime, inlet 12 may be subjected to an air pressure which is less than that encountered in still air. As a result, the mass flow through the airconditioning system will decrease. This will be noted at block 60 of FIG. 4 as an increase in blower speed. and a decrease in blower power consumption. In a hierarchecal stragegy, at block 64, microprocessor 22 will determine an increased blower speed, if possible, for increasing the mass flow through the system, so as to maintain the value of $f(S_B, P_B)$ constant at a preselected value corresponding to a desired mass flow rate. If it is not possible, however, to increase the blower speed to achieve a constant mass flow rate, blend door 28 will be repositioned to maintain a constant temperature discharge from the airconditioning system. As before, if necessary, evaporator flow controller 25 and heater core flow controller 27 may also give commands so as to affect the heat flux delivered by the system to the incoming mass flow. Those skilled in the art will appreciate in view of this disclosure that it is normally preferable to use blend door 28 to accomplish the required changes in heat flux because the blend door is not affected by thermal inertia considerations relevant to evaporator 24 and heater 26.

Various modifications and variations will no doubt occur to those skilled in the arts to which this invention pertains. All such modifications and variations which basically rely on the teachings with which this disclosure has advanced the art are properly considered within the scope of this invention as defined by the appended claims.

We claim:

1. An airconditioning system for a vehicle, comprising:
    an air supply blower;
    an air chilling device;
    an air heating device;
    speed sensing means for determining the speed at which said blower is operating and for generating a speed signal corresponding to said blower speed;
    power sensing means for determining the power being consumed by said blower and for generating a signal corresponding to said power consumption;
    temperature governing means, operatively associated with said air chilling device and said air heating device, for controlling the heat flux imparted by said air chilling device and said air heating device to air supplied by said blower to the interior of said vehicle; and
    control means, responsive to said speed signal and to said power signal, for operating said temperature governing means, comprising:

means for detecting nonprogrammed changes in blower speed and blower power consumption; and means for compensating for said nonprogrammed changes in blower speed and power consumption by changing the operating point of said temperature governing means.

2. An airconditioning system according to claim 1, wherein said control means further comprises speed governing means for controlling the speed at which said blower is operating and means for compensating for said nonprogrammed blower speed and power consumption changes by changing the operating point of said speed governing means.

3. An airconditioning system according to claim 1, wherein said air chilling device comprises an evaporator core for receiving liquid refrigerant which is vaporized in said core.

4. An airconditioning system according to claim 1, wherein said air heating device comprises a heater core for receiving engine coolant.

5. An airconditioning system according to claim 1, wherein said temperature governing means comprises a blend door having the capability of directing the output of said blower over said heater core, with said blend door being operated by said control means.

6. An airconditioning system according to claim 1, wherein said air supply blower comprises an electric motor driving an aerodynamic element.

7. An airconditioning system according to claim 6, wherein said power sensing means comprises means for sensing the current and voltage applied to said blower motor and means for converting said sensed current and voltage into a signal having a magnitude which is proportional to the power consumption of said blower motor.

8. An airconditioning system according to claim 6, wherein said speed sensing means comprises means for sensing electromotive force pulses generated by said blower motor and means for converting said pulses into a signal corresponding to the speed of said blower motor.

9. An airconditioning system according to claim 8, wherein said means for converting said pulses into a signal corresponding to the speed of said blower motor comprises:

means for transforming said pulses into a square wave having a frequency which is equivalent to the frequency of said pulses; and means for counting the frequency of said resultant square wave.

10. An airconditioning system for a vehicle, comprising:

an air supply blower, driven by an electric motor, for bringing outside air into the interior of said vehicle;

an evaporator core having refrigerant flowing therethrough;

a heater core having engine coolant flowing therethrough;

speed sensing means for determining the speed at which said blower is operating and for generating a speed signal corresponding to said blower speed;

speed governing means for controlling the speed at which said blower is operating;

power sensing means for determining the power being consumed by said motor and for generating a signal corresponding to said Power consumption;

temperature governing means, operatively associated with said evaporator core and said heater core, for controlling the temperature of air supplied by said blower to the interior of said vehicle by controlling the heat flux imparted by said evaporator core and said heater core to said air supply; and control means, responsive to said speed and power signals, for operating said temperature governing means and said speed governing means so as to maintain the temperature of conditioned air discharged into the cabin of said vehicle at a selected value, comprising:

means for detecting nonprogrammed changes in blower speed and power consumption; and means for compensating for said nonprogrammed speed and power changes by changing the operating points of at least one of said temperature governing means and said speed governing means.

11. An airconditioning system according to claim 10, wherein said heater core is positioned downstream from said evaporator core and said wherein said temperature governing means comprises a blend door having the capability of directing at least part of the output of said blower over said heater core.

12. An airconditioning system according to claim 11, wherein said temperature governing means further comprises means for controlling the flow of heat through said heater core and the flow of refrigerant through said evaporator.

13. An airconditioning system according to claim 10, wherein said temperature governing means comprises means for controlling the flow of engine coolant through said heater core and the flow of refrigerant through said evaporator.

14. An airconditioning system according to claim 10, wherein said Power sensing means comprises means for sensing the current and voltage applied to said blower motor and means for converting said sensed current and voltage into a signal having a magnitude which is proportional to the power consumption of said blower motor.

15. A method for controlling the output temperature of a vehicular airconditioning system having a blower, an air heating device, an air chilling device and a temperature governing means operatively associated with said air chilling and air heating devices, comprising the steps of:

sensing nonprogrammed changes in the speed and power consumption of said blower;

iteratively determining adjusted operating points for the speed of said blower and said temperature governing means so as to compensate for any nonprogrammed speed and power consumption changes; and directing said blower and said temperature governing means to assume said adjusted operating points.

16. An airconditioning system for a vehicle, comprising:

an air supply blower, driven by an electric motor, for bringing outside air into the interior of said vehicle;

an evaporator core;

a heater core positioned downstream from said evaporator core;

speed sensing means for determining the speed at which said blower is operating and for generating a speed signal corresponding to said blower speed;

speed governing means for controlling the speed at which said blower is operating;

power sensing means for determining the power being consumed by said motor and for generating a signal corresponding to said power consumption;

temperature governing means, operatively associated with said evaporator core and said heater core, for controlling the temperature of air supplied by said blower to the interior of said vehicle with said temperature governing means comprising a blend door having the capability of directing at least part of the output of said blower over said heater core; and control means, responsive to said speed and power consumption signals, for operating said temperature governing means and said speed governing means so as to maintain the temperature of conditioned air discharged into the cabin of said vehicle at a selected value, comprising:

means for detecting nonprogrammed changes in blower speed and power consumption caused by changes in the mass flow rate of air passing through said airconditioning system; and means for compensating for said nonprogrammed speed and power consumption changes by determining new operating points for said temperature governing means and said speed governing means according to a hierarchical strategy, such that a calculated function of said power and speed signals will be regulated at a preselected value so as to maintain the mass flow rate and the temperature of air supplied by said blower to the cabin of said vehicle at selected values, but if such is not possible, maintaining the temperature of air discharged by said airconditioning system at said selected value.

17. An airconditioning system according to claim 16, wherein said temperature governing means further comprises means for controlling the flow of engine coolant through said heater core and the flow of refrigerant through said evaporator.

* * * * *